United States Patent
Daly

(10) Patent No.: US 11,270,704 B2
(45) Date of Patent: *Mar. 8, 2022

(54) VOICE ENABLED MEDIA PRESENTATION SYSTEMS AND METHODS

(71) Applicant: DISH Technologies L.L.C., Englewood, CO (US)

(72) Inventor: Curtis N. Daly, Denver, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,399

(22) Filed: Apr. 19, 2021

(65) Prior Publication Data

US 2021/0243490 A1 Aug. 5, 2021

Related U.S. Application Data

(63) Continuation of application No. 12/491,876, filed on Jun. 25, 2009, now Pat. No. 11,012,732.

(51) Int. Cl.
*G10L 15/26* (2006.01)
*H04N 21/422* (2011.01)

(52) U.S. Cl.
CPC ....... *G10L 15/26* (2013.01); *H04N 21/42203* (2013.01); *H04N 21/42204* (2013.01); *H04N 21/42206* (2013.01)

(58) Field of Classification Search
CPC ........ H04N 21/42204; H04N 21/42206; G10L 15/26
See application file for complete search history.

(56) References Cited

U.S. PATENT DOCUMENTS

| | | |
|---|---|---|
| 4,401,852 A | 8/1983 | Noso et al. |
| 5,199,080 A | 3/1993 | Kimura et al. |
| 5,226,090 A | 7/1993 | Kimura |
| 5,247,580 A | 9/1993 | Kimura et al. |
| 5,267,323 A | 11/1993 | Kimura |
| 5,345,538 A | 9/1994 | Narayannan et al. |
| 5,371,901 A | 12/1994 | Reed et al. |
| 5,774,859 A | 6/1998 | Houser et al. |
| 5,777,571 A | 7/1998 | Chuang |
| 5,832,440 A | 11/1998 | Woodbridge et al. |
| 5,878,394 A | 3/1999 | Mühling |
| 6,185,535 B1 | 2/2001 | Hedin et al. |
| 6,397,388 B1 | 5/2002 | Allen |
| 6,489,986 B1 | 12/2002 | Allen |
| 6,526,381 B1 | 2/2003 | Wilson |
| 6,529,233 B1 | 3/2003 | Allen |

(Continued)

*Primary Examiner* — Nicholas T Corbo
(74) *Attorney, Agent, or Firm* — Seed IP Law Group

(57) ABSTRACT

Various embodiments facilitate voice control of a receiving device, such as a set-top box. In one embodiment, a voice enabled media presentation system ("VEMPS") includes a receiving device and a remote-control device having an audio input device. The VEMPS is configured to obtain audio data via the audio input device, the audio data received from a user and representing a spoken command to control the receiving device. The VEMPS is further configured to determine the spoken command by performing speech recognition on the obtained audio data, and to control the receiving device based on the determined command. This abstract is provided to comply with rules requiring an abstract, and it is submitted with the intention that it will not be used to interpret or limit the scope or meaning of the claims.

18 Claims, 10 Drawing Sheets

(56) References Cited

U.S. PATENT DOCUMENTS

| | | |
|---|---|---|
| 6,606,280 B1 | 8/2003 | Knittel |
| 6,633,846 B1 | 10/2003 | Bennett et al. |
| 6,747,566 B2 | 6/2004 | Hou |
| 6,816,837 B1 | 11/2004 | Davis |
| 6,944,880 B1 | 9/2005 | Allen |
| 7,043,427 B1 | 5/2006 | Kern et al. |
| 7,072,686 B1 | 7/2006 | Schrager |
| 7,080,014 B2 | 7/2006 | Bush et al. |
| 7,136,817 B2 | 11/2006 | Schröder et al. |
| 7,376,556 B2 | 5/2008 | Bennnett |
| 2002/0019732 A1 | 2/2002 | Kikinis et al. |
| 2002/0052746 A1 | 5/2002 | Handelman |
| 2002/0071577 A1 | 6/2002 | Lemay et al. |
| 2002/0094512 A1 | 7/2002 | Bhogal et al. |
| 2002/0124255 A1 | 9/2002 | Reichardt et al. |
| 2003/0005462 A1 | 1/2003 | Broadus et al. |
| 2003/0031465 A1 | 2/2003 | Blake |
| 2004/0064839 A1 | 4/2004 | Watkins |
| 2004/0174858 A1 | 9/2004 | Caspi et al. |
| 2004/0181391 A1 | 9/2004 | Inoue et al. |
| 2006/0235698 A1 | 10/2006 | Cane et al. |
| 2007/0230678 A1 | 10/2007 | Bloebaum et al. |
| 2008/0120665 A1 | 5/2008 | Relyea et al. |

VOICE ENABLED MEDIA PRESENTATION SYSTEMS AND METHODS

TECHNICAL FIELD

The technical field relates to speech recognition and more particularly, to apparatus, systems and methods for controlling a receiving device, such as a set-top box, via voice commands.

BRIEF SUMMARY

In one embodiment, a voice enabled media presentation system is provided. The media presentation system includes a remote-control device including multiple keys and an audio input device, and a set-top box wirelessly communicatively coupled to the remote-control device. The media presentation system is configured to obtain audio data via the audio input device, the audio data received from a user and representing a spoken command to control the set-top box, determine the spoken command by performing speech recognition upon the obtained audio data, control the set-top box in response to the determination of the spoken command, and control the set-top box in response to a user selection of one of the multiple keys of the remote-control device.

In another embodiment, a method for controlling a set-top box is provided. The method includes wirelessly receiving audio data from a remote-control device, the audio data representing a spoken command uttered by a user into an audio input device of the remote-control device, determining the spoken command by performing speech recognition upon the received audio data, and controlling the set-top box device based on the determined command.

In another embodiment, a method in a remote-control device that includes an audio input device and multiple keys is provided. The method includes controlling the set-top box based on a command spoken by a user by receiving audio data via the audio input device, the audio data representing the spoken command, and initiating speech recognition upon the received audio data to determine the spoken command. The method further includes controlling the set-top box in response to a user selection of one of the multiple keys of the remote-control device.

BRIEF DESCRIPTION OF THE DRAWINGS

The components in the drawings are not necessarily to scale relative to each other. Like reference numerals designate corresponding parts throughout the several views.

DETAILED DESCRIPTION

A. Environment Overview

Figure 1:
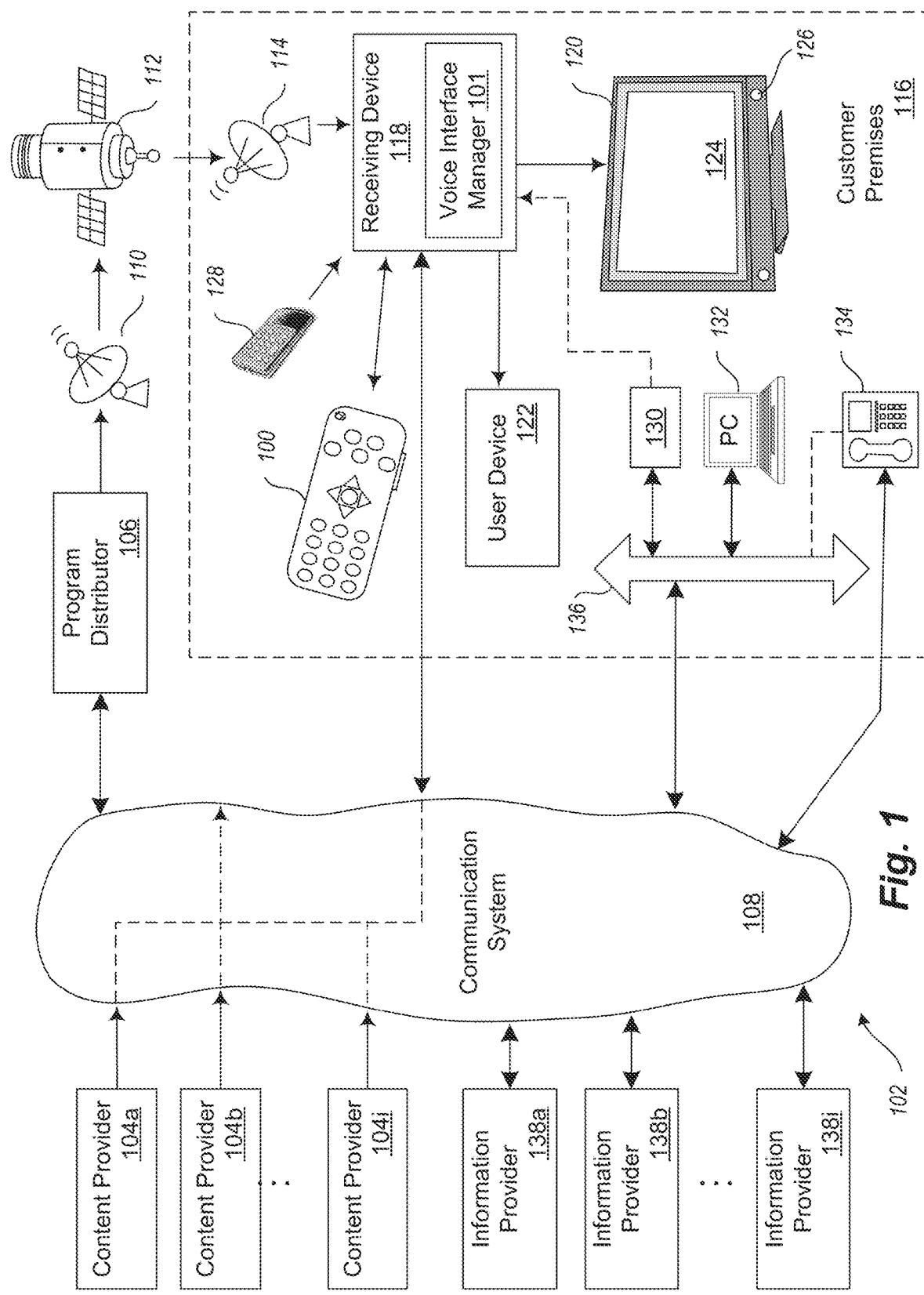
FIG. 1 is a block diagram illustrating an example communication system in which embodiments of a voice enabled media presentation system may be implemented.

FIG. 1 is an overview block diagram illustrating an example communication system 102 in which embodiments of a Voice Enabled Media Presentation System ("VEMPS") may be implemented. It is to be appreciated that FIG. 1 illustrates just one example of a communications system 102 and that the various embodiments discussed herein are not limited to such systems. Communication system 102 can include a variety of communication systems and can use a variety of communication media including, but not limited to, satellite wireless media.

Audio, video, and/or data service providers, such as, but not limited to, television service providers, provide their customers a multitude of audio/video and/or data programming (hereafter, collectively and/or exclusively "programming"). Such programming is often provided by use of a receiving device 118 communicatively coupled to a presentation device 120 configured to receive the programming.

Receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive programming. Further, the receiving device 118 may itself include user interface devices, such as buttons or switches. In many applications, a remote-control device 128 is operable to control the presentation device 120 and other user devices 122.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display 124, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A plurality of content providers 104a-104i provide program content, such as television content or audio content, to a distributor, such as the program distributor 106. Example content providers 104a-104i include television stations which provide local or national television programming, special content providers which provide premium based programming or pay-per-view programming, or radio stations which provide audio programming.

Program content, interchangeably referred to as a program, is communicated to the program distributor 106 from the content providers 104a-104i through suitable communication media, generally illustrated as communication system 108 for convenience. Communication system 108 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. Further, program content communicated from the content providers 104a-104i to the program distributor 106 may be communicated over combinations of media. For example, a television broadcast station may initially communicate program content, via an RF signal or other suitable medium, that is received and then converted into a digital signal suitable for transmission to the program distributor 106 over a fiber optics system. As another nonlimiting example, an audio content provider may communicate audio content via its own satellite system to the program distributor 106.

In at least one embodiment, the received program content is converted by one or more devices (not shown) as necessary at the program distributor 106 into a suitable signal that is communicated (i.e., "uplinked") by one or more antennae 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antenna 114 are operable to receive signals from a single satellite 112. Other types of receiver antenna 114 are operable to receive signals from multiple satellites 112 and/or from terrestrial based transmitters.

The receiver antenna 114 can be located at a customer premises 116. Examples of customer premises 116 include a residence, a business, or any other suitable location operable to receive signals from satellite 112. The received signal is communicated, typically over a hard-wire connection, to a receiving device 118. The receiving device 118 is a conversion device that converts, also referred to as formatting, the received signal from antenna 114 into a signal suitable for communication to a presentation device 120 and/or a user device 122. Often, the receiver antenna 114 is of a parabolic shape that may be mounted on the side or roof of a structure. Other antenna configurations can include, but are not limited to, phased arrays, wands, or other dishes. In some embodiments, the receiver antenna 114 may be remotely located from the customer premises 116. For example, the antenna 114 may be located on the roof of an apartment building, such that the received signals may be transmitted, after possible recoding, via cable or other mechanisms, such as Wi-Fi, to the customer premises 116.

The received signal communicated from the receiver antenna 114 to the receiving device 118 is a relatively weak signal that is amplified, and processed or formatted, by the receiving device 118. The amplified and processed signal is then communicated from the receiving device 118 to a presentation device 120 in a suitable format, such as a television ("TV") or the like, and/or to a user device 122. It is to be appreciated that presentation device 120 may be any suitable device operable to present a program having video information and/or audio information.

User device 122 may be any suitable device that is operable to receive a signal from the receiving device 118, another endpoint device, or from other devices external to the customer premises 116. Additional non-limiting examples of user device 122 include optical media recorders, such as a compact disk ("CD") recorder, a digital versatile disc or digital video disc ("DVD") recorder, a digital video recorder ("DVR"), or a personal video recorder ("PVR"). User device 122 may also include game devices, magnetic tape type recorders, RF transceivers, and personal computers ("PCs").

Interface between the receiving device 118 and a user (not shown) may be provided by a hand-held remote-control device ("remote") 128. Remote 128 typically communicates with the receiving device 118 using a suitable wireless medium, such as infrared ("IR"), RF, or the like. Other devices (not shown) may also be communicatively coupled to the receiving device 118 so as to provide user instructions. Non-limiting examples include game device controllers, keyboards, pointing devices, and the like.

The receiving device 118 may receive programming partially from, or entirely from, another source other than the above-described receiver antenna 114. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

Customer premises 116 may include other devices which are communicatively coupled to communication system 108 via a suitable media. For example, but not limited to, some customer premises 116 include an optional network 136, or a networked system, to which receiving devices 118, presentation devices 120, and/or a variety of user devices 122 can be coupled, collectively referred to as endpoint devices. Non-limiting examples of network 136 include, but are not limited to, an Ethernet, twisted pair Ethernet, an intranet, a local area network ("LAN") system, or the like. One or more endpoint devices, such as PCs, data storage devices, TVs, game systems, sound system receivers, Internet connection devices, digital subscriber loop ("DSL") devices, wireless LAN, WiFi, Worldwide Interoperability for Microwave Access ("WiMax"), or the like, are communicatively coupled to network 136 so that the plurality of endpoint devices are communicatively coupled together. Thus, the network 136 allows the interconnected endpoint devices, and the receiving device 118, to communicate with each other. Alternatively, or in addition, some devices in the customer premises 116 may be directly connected to the communication system 108, such as the telephone 134 which may employ a hardwire connection or an RF signal for coupling to communication system 108.

A plurality of information providers 138a-138i are coupled to communication system 108. Information providers 138a-138i may provide various forms of content and/or services to the various devices residing in the customer premises 116. For example, information provider 138*a* may provide requested information of interest to PC 132. Information providers 138*a*-138*i* may further perform various transactions, such as when a user purchases a product or service via their PC 132.

In the illustrated example, the Voice Enabled Media Presentation System ("VEMPS") includes a voice enabled remote-control device 100 and a voice interface manager 101 operating upon the receiving device 118. The voice enabled remote-control device 100 supports dual interaction modalities of voice and keypad input. Specifically, the remote-control device 100 includes an audio input device (not shown), such as a microphone, as well as a keypad including one or more buttons. The VEMPS is operable to obtain, from a user, audio data via the audio input device, the audio data representing a command spoken by the user. Various commands may be spoken by the user, including a command to select a channel or program, a command to view an electronic program guide, a command to operate a digital video recorder or other user device 122.

The VEMPS is operable to determine the spoken command by performing speech recognition upon the obtained audio data. The performed speech recognition consumes audio data as an input, and outputs one or more words (e.g., as text strings) that were likely spoken by the user, as reflected by the obtained audio data. In some embodiments, the performed speech recognition may also be based upon a grammar that specifies one or more sequences of one or more words that are to be expected by the speech recognition. For example, a grammar may include at least one of channel numbers, network names (e.g., CNN, ABC, NBC, PBS), program names (e.g., "60 Minutes," "The Late Show," "Sport Center"), program categories (e.g., "news," "sports," "comedy"), and/or device commands (e.g., "mute," "louder," "softer," "play," "pause," "record," "help," "menu," "program guide"). By limiting the number and/or type of legal utterances, a grammar can be used to improve the accuracy of the speech recognition, particularly in presence of different speakers, noisy environments, and the like. In other embodiments, a grammar may not be used, and speech recognition may be based instead or in addition on other techniques, such as predictive models (e.g., statistical language models).

The VEMPS then uses the determined spoken command to control the receiving device 118. For example, if the spoken command is to change to channel 13, the receiving device 118 will be tuned to that channel. As another example, if the spoken command was to change to the PBS network, the receiving device 118 will be tuned to the channel carrying programming for that network. In some cases, the spoken command may be ambiguous, in that it could match or otherwise refer to two or more possible commands of the receiving device 118. In such cases, the VEMPS can disambiguate the command by prompting the user for additional information, given in the form of another voice command, a button press, or the like.

In other embodiments, the VEMPS may include additional components or be structured in other ways. For example, functions of the voice interface manager 101 may be distributed between the receiving device 118 and the remote-control device 100. As another example, the voice interface manager 101 or similar component may operate upon (e.g., execute in) other media devices, including the presentation device 124, the user device 122, and the like. Furthermore, the voice interface manager 101, situated within a first device (such as the receiving device 118), can be configured to control other, remote media devices, such as the user device 122, presentation device 124, and the like.

By supporting voice input, the VEMPS provides numerous advantages. For example, the voice input capabilities of the VEMPS facilitates control of the receiving device 118 in low light conditions, which are common during the viewing of programming but which can make reading keys of a remote-control device difficult. In addition, the VEMPS facilitates interaction with novice users, who may not be trained or experienced in the use of a particular remote-control device.

The above description of the communication system 102 and the customer premises 116, and the various devices therein, is intended as a broad, non-limiting overview of an example environment in which various embodiments of a VEMPS may be implemented. The communication system 102 and the various devices therein, may contain other devices, systems and/or media not specifically described herein.

Example embodiments described herein provide applications, tools, data structures and other support to implement a VEMPS that facilitates voice control of media devices. Other embodiments of the described techniques may be used for other purposes, including for interaction with, and control of, remote systems generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Example Voice Enabled Media Presentation System

Figure 2:
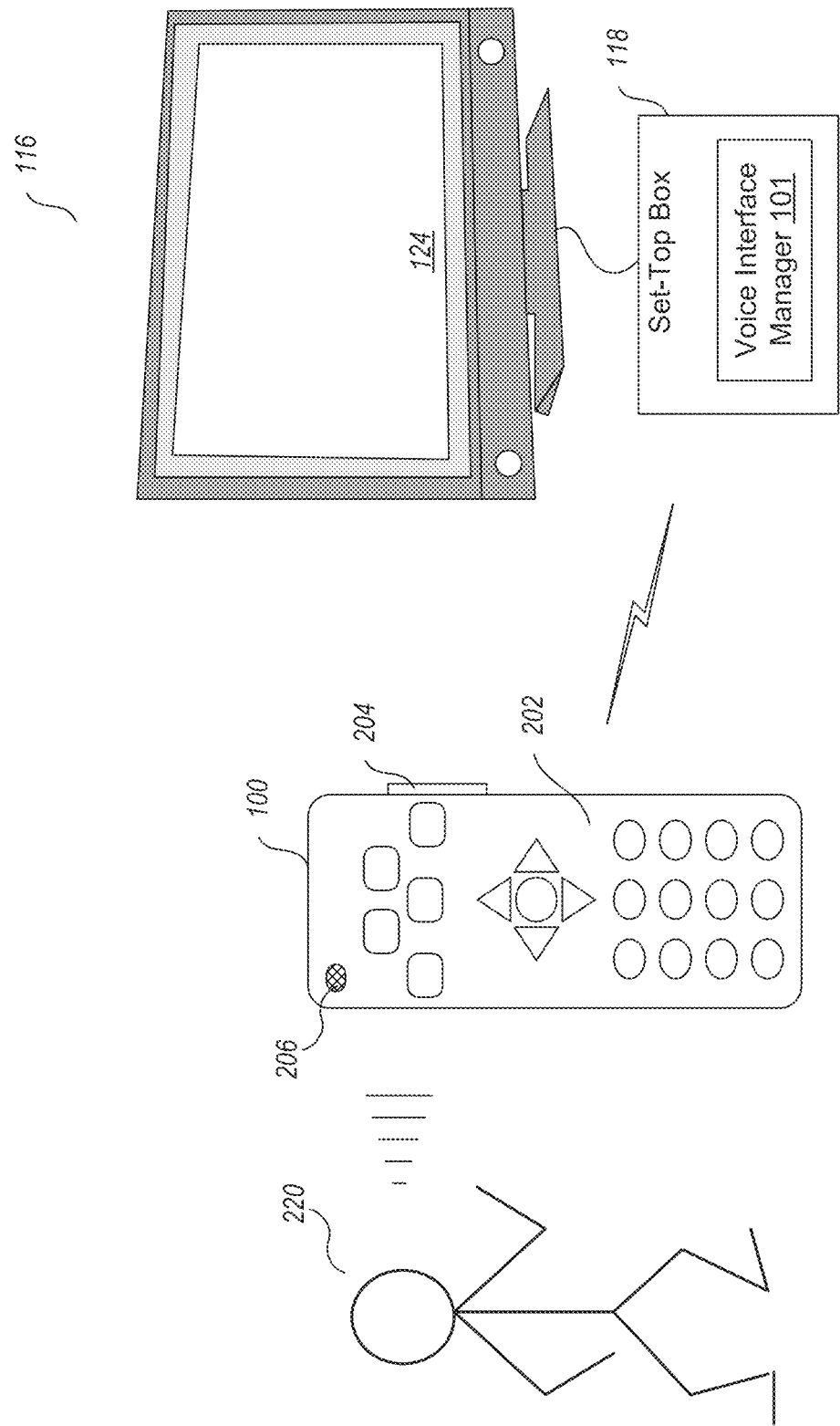
FIG. 2 is a block diagram illustrating example functional elements of an example embodiment.

FIG. 2 is a block diagram illustrating example functional elements of an example embodiment. In the example of FIG. 2, the VEMPS includes a receiving device 118, a voice enabled remote-control device 100, and a presentation device 124. A voice interface manager 101 is executing on the receiving device 118, which is a set-top box in this particular example. The receiving device 118 is communicatively coupled to the presentation device 124. As noted, the receiving device 118 may be communicatively coupled to other media devices, such as a video recorder or audio system, so as to control those media devices based on spoken commands.

The receiving device 118 is also wirelessly communicatively coupled to the voice enabled remote-control device 100. In the illustrated embodiment, the receiving device 118 and voice enabled remote-control device 100 communicate using radio frequency (e.g., UHF) transmissions. In other embodiments, other communication techniques/spectra may be utilized, such as infrared ("IR"), microwave, or the like. The remote-control device 100 includes a keypad 202 having multiple buttons (keys), a voice enable key 204, and a microphone 206. The keypad 202 includes multiple keys that are each associated with a particular command that can be generated by the remote-control device 100 and transmitted to the receiving device 118. The voice enable key provides push-to-talk capability for the remote-control device 100. When the user 220 pushes or otherwise activates the voice enable key 204, the remote-control device 100 begins to receive or capture audio signals received by the microphone 206, and to initiate the voice recognition process, here performed by the voice interface manager 101, as described below.

In the illustrated embodiment, the user 220 can control the receiving device 118 by speaking commands into the microphone 206 of the remote-control device 100. In particular, when the user 220 wishes to issue to a spoken command, the user 220 presses or otherwise actuates the voice enable key 204 and begins uttering the spoken command. When the voice enable key 204 is pressed, the remote-control device 100 begins to transmit an audio signal provided by the microphone 206 to the receiving device 118. The audio signal represents the command spoken by the user, and may do so in various ways, including in analog or digital formats. In one example, the remote-control device 100 digitally samples an analog signal provided by the microphone 206, and transmits the digital samples to the voice interface manager 101 of the receiving device 118. The digital samples are transmitted in a streaming fashion, such that the remote-control device 100 sends samples as soon as, or nearly as soon as, they are generated by the microphone 206 or other sampling component.

The voice interface manager 101 receives the audio signal and performs speech recognition to determine the spoken command. The voice interface manager 101 includes a speech recognizer that consumes as input audio data representing a spoken utterance, and provides as output a textual representation of the spoken utterance. In addition, the speech recognizer may utilize a grammar that specifies a universe of legal utterances, so as to improve recognition time and/or accuracy. The speech recognizer may utilize various techniques, including Hidden Markov Models ("HMMs"), Dynamic Time Warping ("DTW"), neural networks, or the like. Furthermore, the speech recognizer may be configured to operate in substantially real time. For example, if the voice interface manager 101 receives speech audio samples sent in a streaming fashion by the remote-control device 100, then the voice interface manager 101 can initiate speech recognition as soon as one or more initial speech audio samples are received, so that the speech recognizer can begin to operate shortly after the user 220 begins his utterance.

The voice interface manager 101 may also perform various signal processing tasks prior to providing audio data to the speech recognizer. In one embodiment, the voice interface manager 101 subtracts, from the audio data received from the remote-control device 100, the output audio signal provided by the receiving device 118. In this manner, the performance of the speech recognizer may be improved by removing from the received audio data any audio that is part of a program being currently presented by the receiving device 118. The voice interface manager 101 may perform other signal processing functions, such as noise reduction, signal equalization, echo cancellation, or filtering, prior to providing the received audio data to the speech recognizer.

Upon determining the spoken command, the voice interface manager 101 initiates a receiving device command corresponding to the determined spoken command. For example, if the determined spoken command is to turn up the audio volume, the voice interface manager 101 will make or initiate corresponding adjustments to the audio output of the receiving device 118. Or, if the determined spoken command is to select a particular programming, the voice interface manager 101 direct the receiving device 118 to present the selected programming upon the presentation device 124. In general, the voice interface manager 101 can be configured to provide, via one or more voice commands, access to any operational state or capability of the receiving device 118. Of course, in various embodiments, the voice interface manager 101 may provide access to only some subset of the capabilities of the receiving device 118, limited for example to those capabilities that are frequently used by typical users.

In the above example, the voice interface manager 101 performed all or substantially all aspects of speech recognition upon audio data received from the remote-control device 100. In other embodiments, speech recognition may be performed in other ways or at other locations. For example, in one embodiment, the remote-control device 100 may include a speech recognizer, such that substantially all speech recognition is performed at the remote-control device 100. In another embodiment, the performance of various speech recognition tasks is distributed between the remote-control device 100 and the voice interface manager 101. For example, the remote-control device 100 may be configured to extract information about the audio signal, such as acoustic features (e.g., frequency coefficients), and transmit that information to the voice interface manager 101, where the information can be further processed to complete speech recognition.

In another embodiment, the remote-control device 100 does not include the voice enable key 204 or similar input device. Instead, the remote-control device 100 can be configured to automatically detect the beginning and/or end of a user's utterance, by using various speech activity detection techniques. Aside from transmitting audio data to the voice interface manager, the remote-control 100 may send additional signals related to speech processing, such as beginning/end of utterance signals.

In another embodiment, the voice interface manager 101 may be controlled by voice inputs received from a source other than the remote-control device 100. In particular, the voice interface manager 101 may receive audio data representing a spoken command from a device that is remote from the customer premises, such as a telephone or remote computer. For example, a traveling user might place a call on a telephone (e.g., cell phone) or a voice-over-IP client (e.g., executing on a personal computer) to the voice interface manager 101 to schedule the recording of a particular program. In such an embodiment, the voice interface manager 101 provides output to the user via voice prompts that are either pre-recorded or automatically generated by a speech synthesis system. In this manner, the voice interface manager 101 acts as a type of interactive voice response ("IVR") system that provides an interface to at least some of the functions of the receiving device 118. Other and/or additional output modalities are also contemplated, such as sending emails, instant messages, text messages, and the like.

C. Example Voice Enabled Media Presentation System User Interface

FIGS. 3A-3D are block diagrams illustrating example user interfaces provided by example embodiments. FIGS. 3A-3D illustrate various user interface elements provided by one or more example voice enabled media presentation systems. In particular, FIGS. 3A-3D show a user interface 300 displayed upon a presentation device 124 coupled to a receiving device 118 having a voice interface manager 101, such as is described with reference to FIG. 2. In these examples, the user interface 300 is displaying a sports program, along with additional elements that assist the user in engaging in voice interaction with the receiving device 118.

Figure 3A:
FIGS. 3A-3D are block diagrams illustrating example user interfaces provided by example embodiments.

In the example of FIG. 3A, the user 220 has pressed the voice enable button 204. In response, the VEMPS initiates display of an icon 304 that indicates that the voice interface manager 101 is ready to accept (e.g., listening for) a spoken command. The icon 304 serves as a prompt to the user to begin speaking.

Also in response to the pressing of the voice enable button 204, the VEMPS mutes or reduces any audio output being currently provided by the receiving device 118. In this manner, the VEMPS minimizes the amount of background noise/audio that may degrade the quality of the speech recognition performed upon the user's utterance. In some embodiments, the VEMPS may also cause audio output of other devices to be muted. For example, if the receiving device 118 is coupled to a home audio system, the VEMPS may mute or reduce any audio output being currently provided by the home audio system. As noted above, in some embodiments, the voice audio manager may instead (or in addition) perform signal processing operations on the audio data representing the user's speech in order to subtract or otherwise reduce the presence of other audio components (such as program audio) in the user's audio data.

Figure 3B:
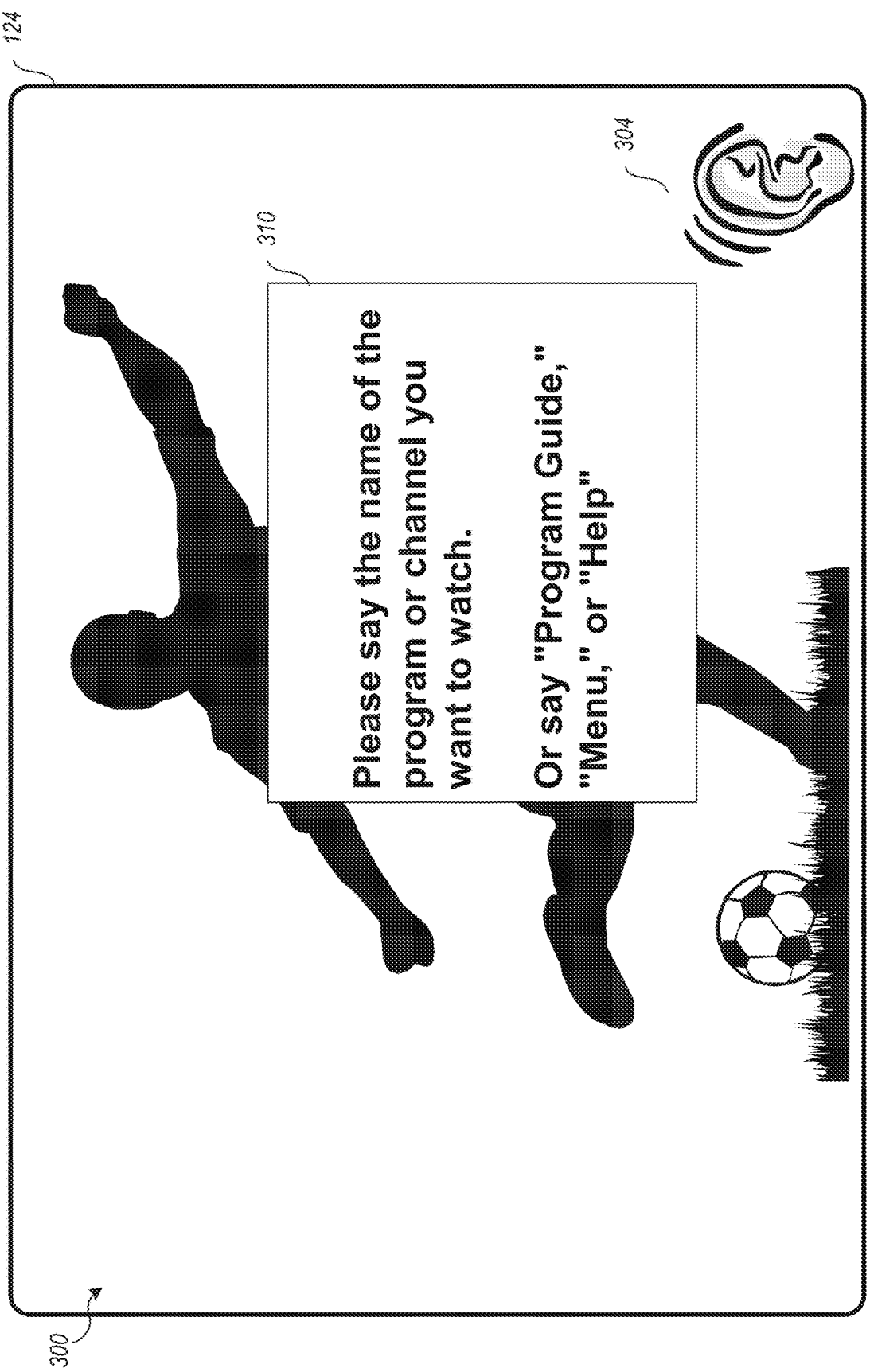

In the example of FIG. 3B, the VEMPS has displayed, in addition to the icon 304, a textual prompt 310. In this example, the prompt 310 directs the user to say the name of a program (e.g., "60 Minutes," "The Simpsons," "Sports Center") or a channel (e.g., "channel 7," or "seven") they want to watch. The prompt 310 also includes an indication of at least some of the other commands available to the user, such as "program guide" (e.g., to display an electronic program guide), "menu" (e.g., to display a menu of the receiving device), or "help" (e.g., to display a help screen). Other commands are contemplated, including commands to power up/down a media device (e.g., receiving device, audio system, presentation device), to access media recording functions provided by a receiving device or some other media device (e.g., "play," "pause," "go back"), to access a favorites list (e.g., "favorites"), to modify a view of an electronic program guide (e.g., "page up," "page down," "next"), to select programming identified by an electronic program guide (e.g., "show me that program").

The prompt 310 may be displayed in various ways and under various circumstances. For example, the prompt 310 may be displayed in response to, and immediately after, the voice enable button 204 being pressed by the user. In other embodiments, the prompt 310 is displayed upon detection of a period of silence from the user. For example, if the user has pressed the voice enable button 204, but no speech is detected for a specified time interval, then the VEMPS may display the prompt 310 to further encourage and instruct the user to utter a spoken command. In another embodiment, the prompt 310 may be displayed only during a particular time interval, such as during the first few days or weeks of usage of the VEMPS, so as to train new users as to the functions of the VEMPS. In a further embodiment, the display of the prompt 310 may be configurable, such that a user can select whether the prompt 310 is to be displayed in response to activation of the voice enable button 204 or other event.

Figure 3C:
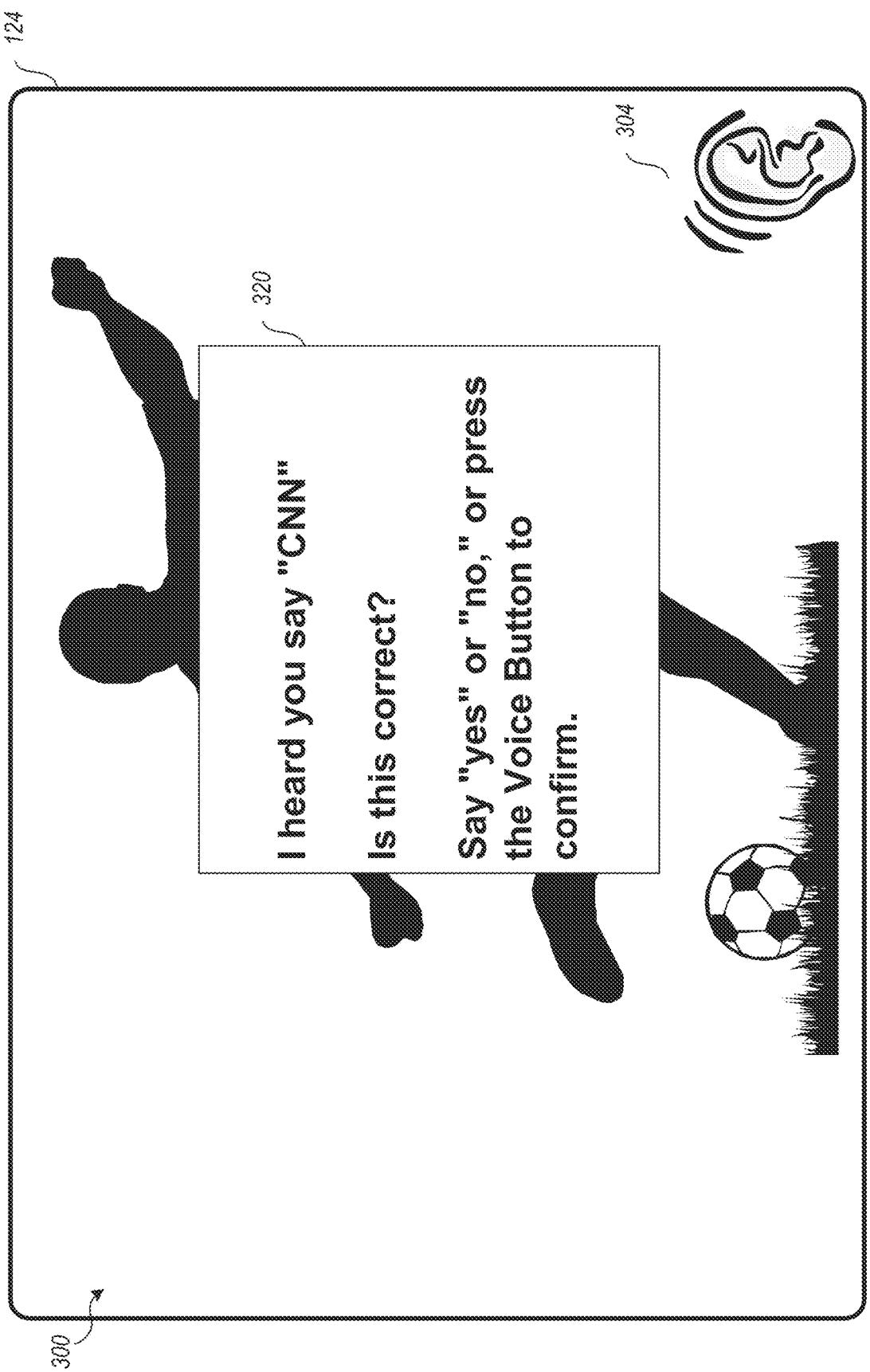

In the example of FIG. 3C, the VEMPS has displayed a confirmation prompt 320. The prompt 320 is displayed after the VEMPS has recognized a command in a user's utterance, and asks the user to confirm the recognized command. In some implementations, the speech recognizer utilized by the VEMPS provides a confidence value associated with speech recognition results. These confidence values reflect the recognizer's confidence that the recognized text result actually corresponds to the speaker's utterance. In such embodiments, the VEMPS may selectively utilize the prompt 320 to confirm recognized commands in cases when the associated confidence is below some threshold level.

The user can respond to the confirmation prompt 320 in various ways. For example, the user can respond by speaking "yes" or "no," or equivalent responses (e.g., "sure" or "okay" for yes, or "nope" or "naw" for no). Or the user can respond by performing one or more actions on the keypad of the remote-control device 100. In one embodiment, the user can click the voice enable button 204 once or twice to respectively confirm or deny the recognized command.

Figure 3D:
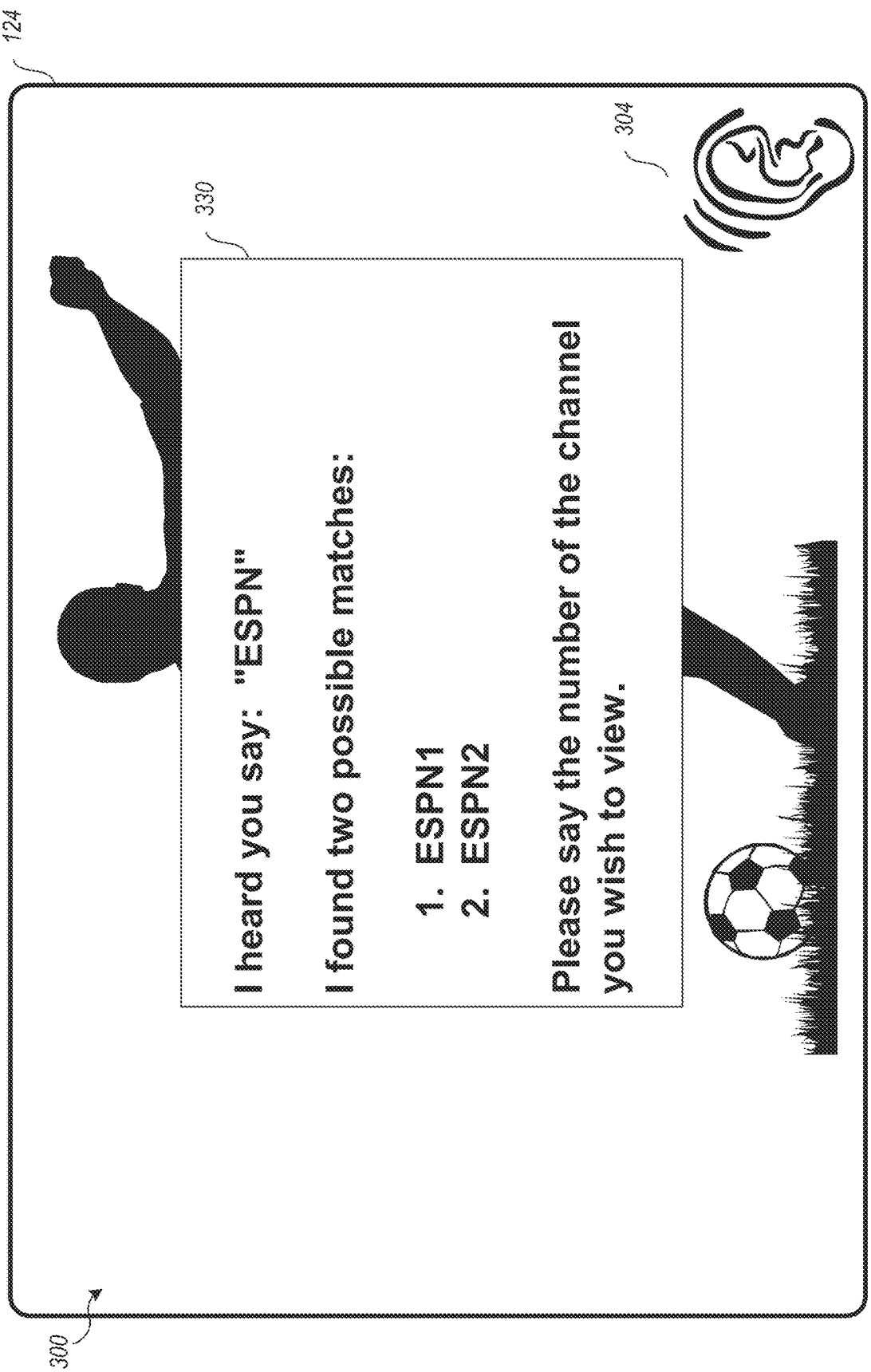

In the example of FIG. 3D, the VEMPS has displayed a disambiguation prompt 330. The prompt 330 is displayed after the VEMPS has determined multiple possible matches for the command recognized in a user's utterance. In the illustrated example, the user has spoken "ESPN" and the VEMPS has determined that there are two possible channels ("ESPN1" and "ESPN2") that could correspond to the spoken utterance. To disambiguate the two possible matches, the VEMPS displays the prompt 330 to direct the user to select one of the matches.

The user can respond to the confirmation prompt 330 in various ways. For example, the user can respond by saying the number (e.g., "one" or "two") of the displayed match they wish to select. Or the user can respond by performing one or more actions on the keypad of the remote-control device 100. In one embodiment, the user can click the voice enable button 204 to successively highlight the displayed matches, until the preferred match is selected. In another embodiment, the user can enter the number of the preferred match using number keys of the keypad 202.

Other user interface features are contemplated. In one embodiment, the VEMPS may use text-to-speech synthesis and/or pre-recorded messages to prompt or otherwise interact with a user. For example, when the user selects the voice enable button 204, the VEMPS may play an audio prompt that says, "I'm listening" or "How can I help you?" The audio prompt may be output by a speaker that is part of the remote-control device 100 or some other speaker, such as one associated with the presentation device 124.

D. Example Computing System Implementation

Figure 4:
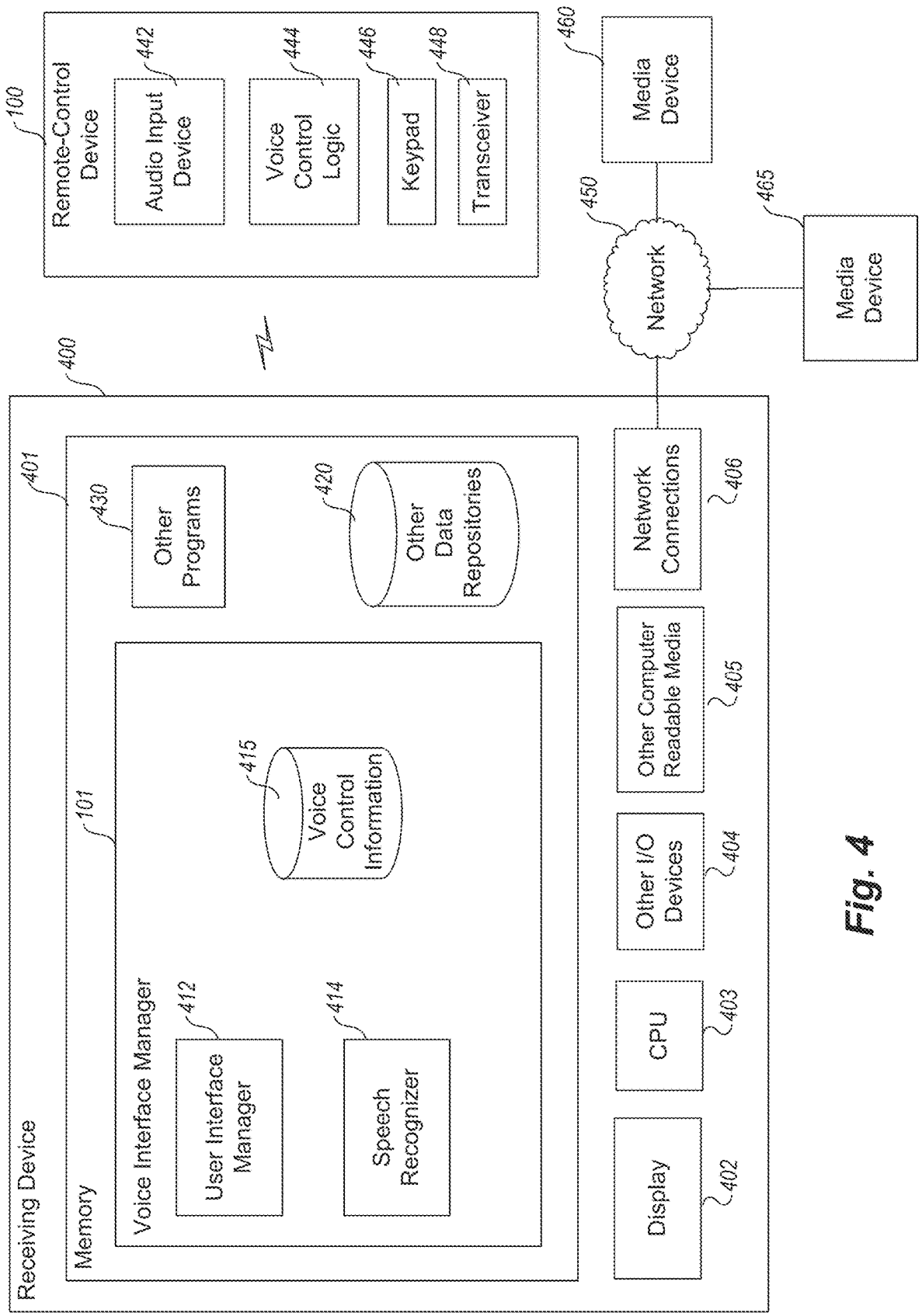
FIG. 4 is a block diagram of a computing system for practicing example embodiments of a voice enabled media presentation system.

FIG. 4 is a block diagram of a computing system for practicing example embodiments of a voice enabled media presentation system. As shown in FIG. 4, the described voice enabled media presentation system ("VEMPS") includes a voice enabled remote-control device 100 and a receiving device computing system 400 having a voice interface manager 101. In one embodiment, the receiving device computing system 400 is part of a set-top box configured to receive and display programming on a presentation device. Note that the computing system 400 may comprise one or more distinct computing systems/devices and may span distributed locations. Furthermore, each block shown may represent one or more such blocks as appropriate to a specific embodiment or may be combined with other blocks. Also, components of the VEMPS, such as the voice interface manager 101 and voice control logic 444 may be implemented in software, hardware, firmware, or in some combination to achieve the capabilities described herein.

In the embodiment shown, receiving device computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. The voice interface manager 101 is shown residing in memory 401. In other embodiments, some portion of the contents, some of, or all of the components of the voice interface manager 101 may be stored on and/or transmitted over the other computer-readable media 405. The components of the voice interface manager 101 preferably execute on one or more CPUs 403 and facilitate voice control of the receiving device computing system 400 and/or other media devices, as described herein. Other code or programs 430 (e.g., an audio/video processing module, an electronic program guide manager module, a Web server, and the like) and potentially other data repositories, such as data repository 420 (e.g., including stored programming), also reside in the memory 410, and preferably execute on one or more CPUs 403. Of note, one or more of the components in FIG. 4 may not be present in any specific implementation. For example, some embodiments may not include a display 402, and instead utilize a display provided by another media device, such as a presentation device 124.

The remote-control device 100 includes an audio input device 442, voice control logic 444, a keypad 446, and a transceiver 448. The audio input device 442 includes a microphone and provides audio data, such as digital audio samples reflecting an audio signal generated by the microphone. The voice control logic 444 performs the core voice enabling functions of the remote-control device 100. In particular, the voice control logic 444 receives audio data from the audio input device 442 and wirelessly transmits, via the transceiver 448, the audio data to the voice interface manager 101. As noted, various communication techniques are contemplated, including radio frequency (e.g., UHF), microwave, infrared, or the like. The voice control logic 444 also receives input events generated by the keypad 446 and transmits those events, or commands corresponding to those events, to the voice interface manager. The remote-control device 100 may include other components that are not illustrated here. For example, the remote-control device 100 may include a speaker to provide audio output to the user, such as audible beeps, voice prompts, etc.

In a typical embodiment, the voice interface manager 101 includes a user interface manager 412, a speech recognizer 414, and a data repository 415 that includes voice control information. Other and/or different modules may be implemented. For example, the voice interface manager 101 may include a natural language engine configured to perform various natural language processing tasks (e.g., parsing, tagging, categorization) upon results provided by the speech recognizer 414, using various symbolic and/or statistical processing techniques. The voice interface manager 101 also interacts via a network 450 with media devices 460-465. The network 450 may be include various type of communication systems, including wired or wireless networks, point-to-point connections (e.g., serial lines, media connection cables, etc.), and the like. Media devices 460-465 may include video recorders, audio systems, presentation devices, home computing systems, and the like. The voice interface manager 101 may also include a speech synthesizer configured to convert text into speech, so that the voice interface manager 101 may provide audio output (e.g., spoken words) to a user. The audio output may be provided to the user in various ways, including via one or more speakers associated with one of the media devices 460-465 or the remote-control device 100.

The user interface manager 412 performs the core functions of the voice interface manager 101. In particular, the user interface manager 412 receives audio data from the remote-control device 100. The user interface manager 412 also receives events and/or commands from the remote-control device 100, such as indications of button selections on the keypad 446 and/or other signaling information (e.g., a flag or other message indicating the beginning and/or end of user speech) transmitted by the remote-control device 100.

The user interface manager 412 also interfaces with the speech recognizer 414. For example, the user interface manager 412 provides received audio data to the speech recognizer 414. The user interface manager 412 also configures the operation of the speech recognizer 414, such as by initialization, specifying speech recognition grammars, setting tuning parameters, and the like. The user interface manager 412 further receives output from the speech recognizer 414 in the form of recognition results, which indicate words (e.g., as text strings) that were likely uttered by the user. Recognition results provided by the speech recognizer 414 may also indicate that no recognition was possible, for example, because the user did not speak, the audio data included excessive noise or other audio signals that obscured the user's utterance, the user's utterance was not included in a recognition grammar, or the like.

The user interface manager 412 further controls the operation of the receiving device computing system 400 based on recognition results provided by the speech recognizer 414. For example, given a recognition result that includes one or more words, the user interface manager 412 determines a command that corresponds to the recognized one or more words. Then, the user interface manager 412 initiates or executes the determined command, such as by selecting a new channel, adjusting the audio output volume, turning on/off an associated media device, or the like. As discussed above, the user interface manager 412 may in some cases confirm a recognition result and/or disambiguate multiple possible commands corresponding to the recognition result.

The data repository 415 records voice control information that is used by the voice interface manager 101. Voice control information includes recognition grammars that are utilized by the speech recognizer 414. Voice control information may further include one or mappings of user utterances (e.g., represented as text strings) to commands/functions, so that a particular user utterance may be associated with one or more possible commands corresponding to the utterance. Voice control information may also include audio files that include pre-recorded audio prompts or other messages that may be played by the voice interface manager 101 to interact with a user. Voice control information may further include logging information, such as recordings of audio data received by the voice interface manager 101, recognition results received from the speech recognizer 414, and the like.

In an example embodiment, components/modules of the voice interface manager 101 and the voice control logic 444 are implemented using standard programming techniques. For example, the voice control logic 444 may also be implemented as a sequence of "native" instructions executing on a CPU (not shown) of the remote-control device 100. In addition, the voice interface manager 101 may be implemented as a native executable running on the CPU 403, along with one or more static or dynamic libraries. In other embodiments, the voice interface manager 101 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a VEMPS implementation. Also, other functions could be implemented and/or performed by each component/module, and in different orders, and by different components/modules, yet still achieve the functions of the VEMPS.

In addition, programming interfaces to the data stored as part of the voice interface manager 101, such as in the data repository 415, can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 415 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of a VEMPS.

In particular, all or some of the voice interface manager 101 and/or the voice control logic 444 may be distributed amongst other components/devices. For example, the speech recognizer 414 may be located on the remote-control device 100 or on some other system, such as a home computer (not shown) accessible via the network 450.

Furthermore, in some embodiments, some or all of the components of the voice interface manager 101 and/or the voice control logic 444 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

E. Processes

Figure 5:
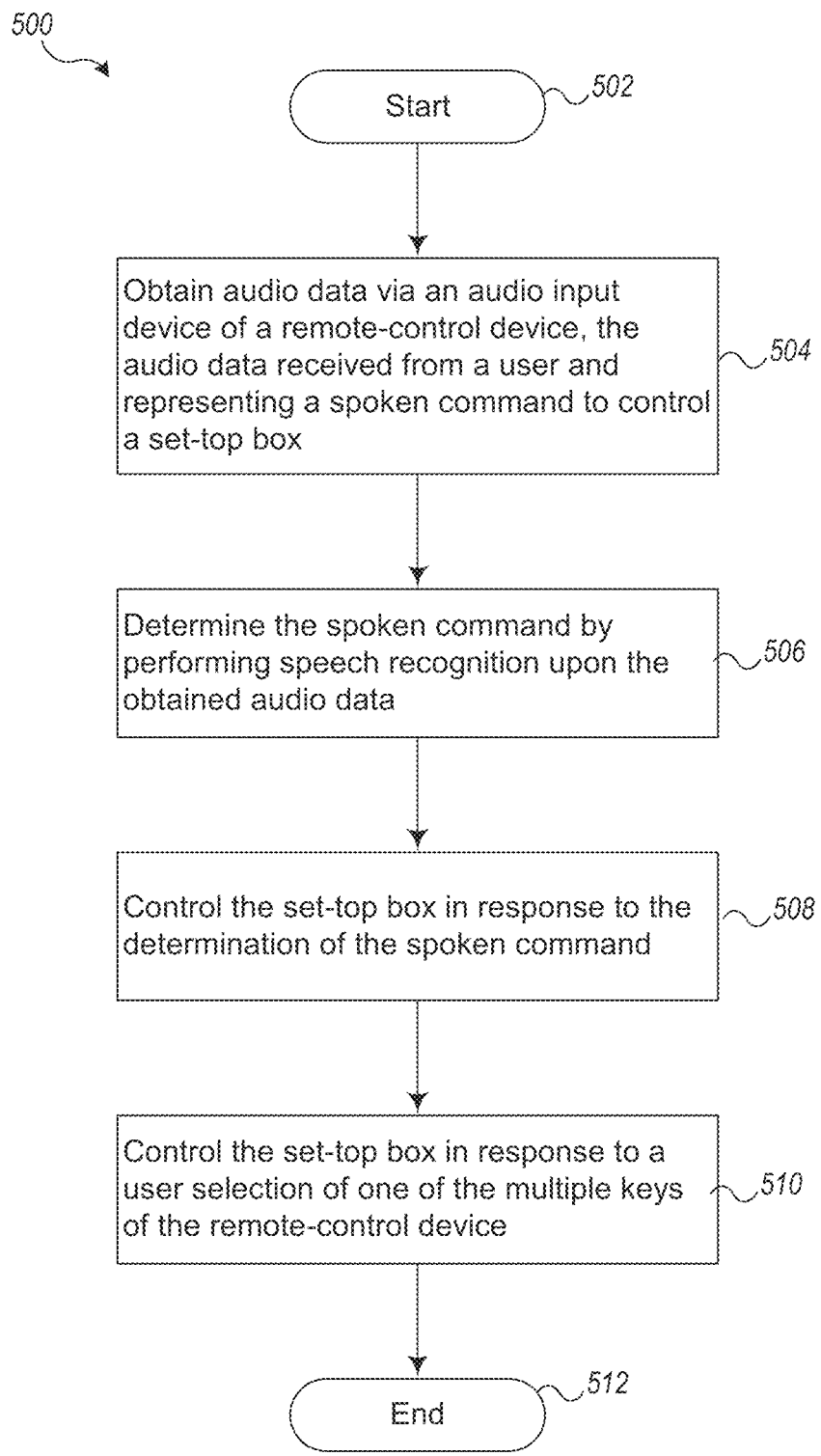
FIG. 5 is a flow diagram of an example embodiment of a voice enabled media presentation system.
Figure 6:
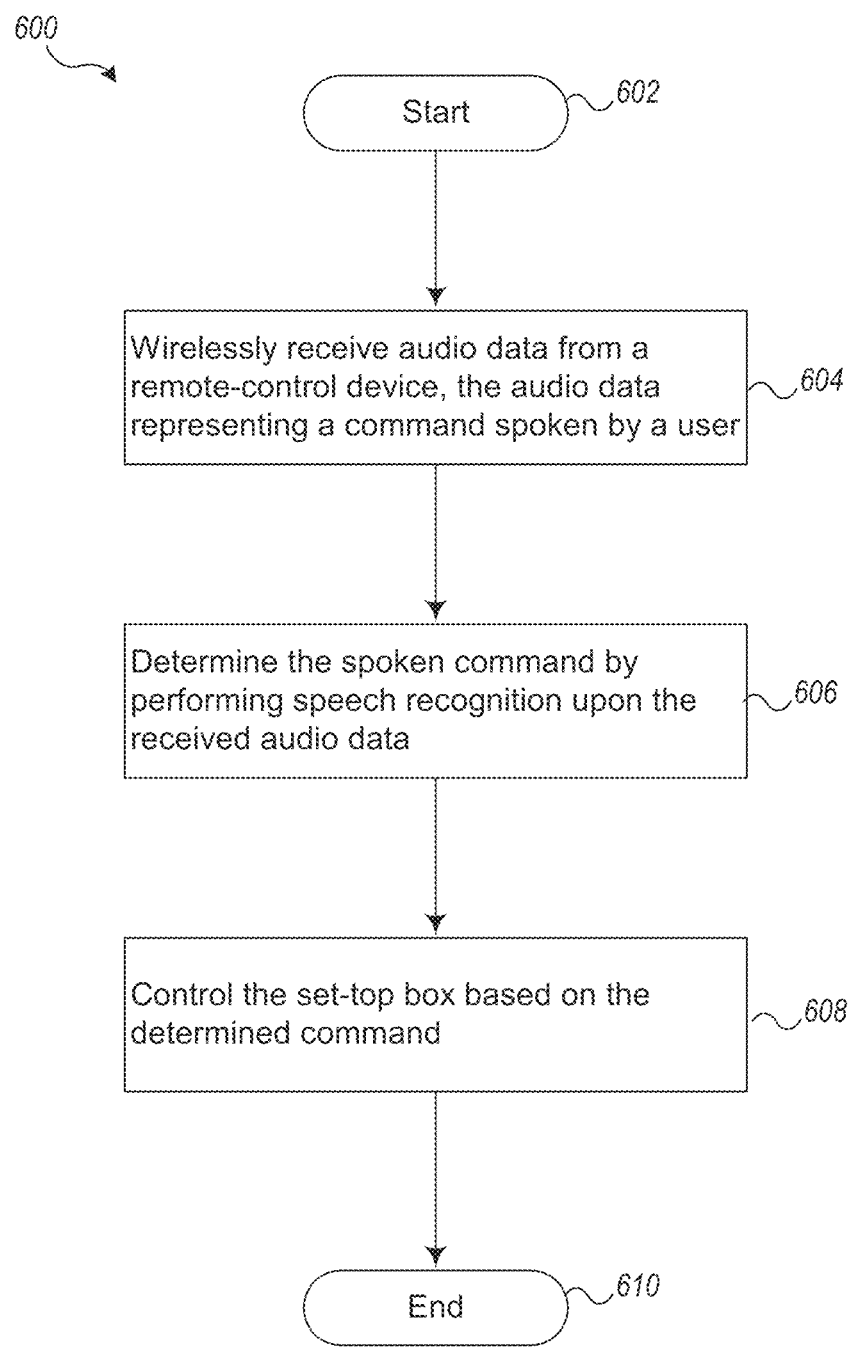
FIG. 6 is a flow diagram of an example voice enabled receiving device process provided by an example embodiment.
Figure 7:
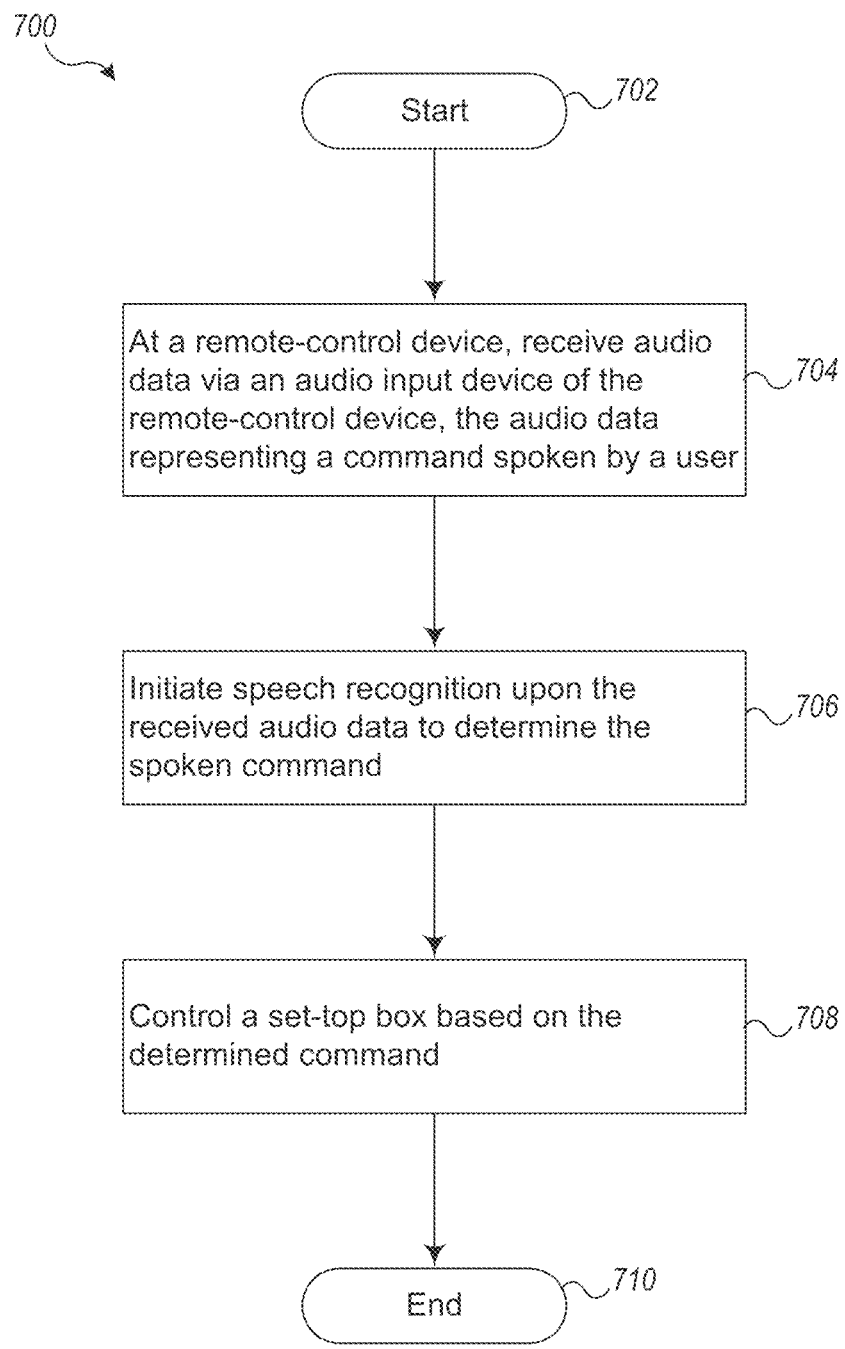
FIG. 7 is a flow diagram of an example voice enabled remote-control device process provided by an example embodiment.

FIGS. 5-7 are flow diagrams of various processes provided by example embodiments. In particular, FIG. 5 is a flow diagram of an example embodiment of a voice enabled media presentation system. More specifically, FIG. 5 illustrates process 500 that may be implemented by, for example, one or more modules/components of the receiving device computing system 400 and the remote-control device 100, such as the voice interface manager 101 and the voice control logic 444, as described with respect to FIG. 4.

The illustrated process 500 starts at 502. At 504, the process obtains audio data via an audio input device of a remote-control device, the audio data received from a user and representing a spoken command to control a receiving device. Typically, the remote-control device wirelessly transmits the audio data to the receiving device.

At 506, the process determines the spoken command by performing speech recognition upon the obtained audio data. The speech recognition may be performed at, for example, the receiving device and/or the remote-control device. Furthermore, the process may also confirm and/or disambiguate one or more candidate spoken commands determined by the speech recognition.

At 508, the process controls the receiving device in response to the determination of the spoken command. Controlling the receiving device may include initiating or invoking one or more functions of the receiving device that correspond to the spoken command.

At 510, the process controls the receiving device in response to a user selection of one of the multiple keys of the remote-control device. As discussed, the remote-control device is also configured to transmit to the receiving device other commands, such as those selected by operation of one or more keys on the remote-control device. In this manner, the remote-control device supports dual interaction modalities of voice and keyboard input.

At 512, the process ends. In other embodiments, the process may instead continue to one of steps 504-510 in order to process further voice commands received from the user.

Some embodiments perform one or more operations/aspects in addition to the ones described with respect to process 500. For example, in one embodiment, process 500 does not perform step 510, and focuses primarily on processing voice commands received from the user.

FIG. 6 is a flow diagram of an example voice enabled receiving device process provided by an example embodiment. More specifically, FIG. 6 illustrates process 600 that may be implemented by, for example, the voice interface manager 101 executing on the receiving device computing system 400, as described with respect to FIG. 4.

The illustrated process 600 starts at 602. At 604, the process wirelessly receives audio data from a remote-control device, the audio data representing a command spoken by a user. In this example embodiment, the audio data includes multiple digital audio samples. Use of various audio data formats is contemplated, including various sample sizes, compression techniques, sampling rates, and the like. For example, in one embodiment, audio data is transmitted in an 8-bit, 8-kHz ULAW format.

In some embodiments, the process also causes audio output provided by the receiving device (or other device controllable by the receiving device) to be muted, during the period when the user is speaking a command. The process may determine that the user is speaking in various ways, such as by employing automated voice activity detection, based upon a signal received from the remote-control device (e.g., generated by the remote-control device in response to the user pressing a voice enable key), based on receiving a first portion of the audio data, or the like.

At 606, the process determines the spoken command by performing speech recognition upon the received audio data. Performing speech recognition upon the received audio data includes configuring a speech recognizer, such as by specifying a recognition grammar and other parameters required for operation. Performing speech recognition also includes communicating, or initiating the communication of, the received audio data to the speech recognizer. Such communication may be accomplished in various ways, such as by message passing, sockets, pipes, function calls, and the like. Typically, the audio data is communicated to the speech recognizer concurrently with its receipt, so that the operation of the speech recognizer can occur in substantially real time, as the user utters the spoken command. When the speech recognizer recognizes one or more words (possibly as specified by a recognition grammar) in the audio data, these words are provided to the routine.

At 608, the process controls the receiving device based on the determined command. Controlling the receiving device includes invoking one or more functions of the receiving device that correspond to the determined command. As discussed in more detail above, those functions can include channel/program selection, audio output control, menu selection, presentation device control, or the like.

At 610, the process ends. In other embodiments, the process may instead continue to one of steps 604-608 in order to process further voice commands received from a user.

Some embodiments perform one or more operations/aspects in addition to the ones described with respect to process 600. For example, in one embodiment, process 600 performs a disambiguation function when a spoken command can be mapped to, or corresponds with, multiple receiving device commands.

FIG. 7 is a flow diagram of an example voice enabled remote-control device process provided by an example embodiment. More specifically, FIG. 7 illustrates process 700 that may be implemented by, for example, the voice control logic 444 executing on the remote-control device 100, as described with respect to FIG. 4.

The illustrated process 700 starts at 702. At 704, the process receives audio data at the remote-control device 100 via an audio input device of the remote-control device, the audio data representing a command spoken by a user. As noted, the received audio data may include multiple digital audio samples representing an audio signal received by a microphone of the remote-control device.

In some cases, the process initiates the receiving of audio data in response to a voice enable (e.g., push-to-talk) key/button pressed by the user. In other cases, the process initiates the receiving of audio data based on voice activity detection performed on the audio signal provided by the audio input device of the remote-control device.

At 706, the process initiates speech recognition upon the received audio data to determine the spoken command. In one embodiment, initiating speech recognition includes transmitting the received audio data to the receiving device, which includes a speech recognizer. In another embodiment, initiating speech recognition includes providing the received audio data to a speech recognizer local to the remote-control device.

At 708, the process controls a receiving device based on the determined command. In an embodiment where speech recognition is performed at a remote receiving device, controlling the receiving device based on the determined command is performed by the act of transmitting the audio data to the receiving device. It may include other actions, such as transmitted signals (e.g., generated by keys pressed by the user) provided by the process in response to confirmation prompts or other disambiguation functions. In an embodiment where speech recognition is performed locally at the remote-control device, controlling the receiving device based on the determined command includes transmitting one or more command signals (e.g., representing messages, codes, packets, or the like) to the receiving device that invoke one or more functions of the receiving device.

At 710, the process ends. In other embodiments, the process may instead continue to one of steps 704-708 in order to process further voice commands received from the user.

Some embodiments perform one or more operations/aspects in addition to the ones described with respect to process 700. For example, in one embodiment, process 700 performs additional signal processing functions on the received audio data, such as noise reduction and/or echo cancellation.

While various embodiments have been described hereinabove, it is to be appreciated that various changes in form and detail may be made without departing from the spirit and scope of the invention(s) presently or hereafter claimed.

The invention claimed is:

1. A media presentation system, comprising:
a remote-control device including multiple keys and an audio input device; and
a media presentation system device wirelessly communicatively coupled to the remote-control device,
wherein the media presentation system is configured to:
receive a signal transmitted by the remote-control device, the signal indicating a voice enable key of the remote-control device being pressed by the user, the signal including signaling information including a flag indicating a beginning of user speech and wherein the signal is generated in response to the voice enable key of the remote-control device being pressed by the user;
in response to the receiving the signal transmitted by the remote-control device generated in response to the voice enable key of the remote-control device being pressed by the user, reduce audio output volume provided by the media presentation system device, cause audio output of other devices than the media presentation system device to be muted and immediately play a prompt that indicates that the media presentation system is ready to accept a spoken command; and after the audio is reduced in response to the voice enable key of the remote-control device being pressed by the user, receive audio data including data representing speech of the user including a media presentation system device command from the user.

2. The media presentation system of claim 1 wherein the remote-control device is configured to transmit the audio data to the media presentation system device, and wherein the media presentation system device is configured to perform speech recognition upon the obtained audio data.

3. The media presentation system of claim 2 wherein the remote-control device is configured to perform at least some of the speech recognition upon the audio data.

4. The media presentation system of claim 1 wherein the media presentation system device command includes a program title to identify programming and the media presentation system device is configured to present the identified programming in response to a determination of the spoken command.

5. A method of controlling a media presentation system device, comprising:
receiving a signal transmitted by a device that is remote from a customer premises on which the media presentation system device is located, the signal indicating a voice enable key of the device being pressed by the user, the signal including signaling information including a flag indicating a beginning of user speech and wherein the signal is generated in response to a voice enable key of the device being pressed by the user;
wirelessly receiving audio data from the device that is remote from the customer premises on which the media presentation system device is located, the audio data representing a spoken command uttered by a user into an audio input device of the device that is remote from the customer premises, wherein the spoken command includes a command to schedule a recording of a particular program identified by the spoken command;
determining the spoken command by performing speech recognition upon the received audio data;
controlling the media presentation system device based on the determined command by scheduling recording by the media presentation system device of the particular program identified by the spoken command;
in response to receiving the signal, reducing audio output volume provided by the media presentation system device.

6. The method of claim 5 wherein the spoken command additionally includes a request for help.

7. A method of controlling a media presentation system device comprising:
receiving a signal transmitted by a remote-control device, the signal indicating a voice enable key of the remote-control device being pressed by the user, the signal including signaling information including a flag indicating a beginning of user speech and wherein the signal is generated in response to the voice enable key of the remote-control device being pressed by the user;
in response to the receiving the signal transmitted by the remote-control device generated in response to the voice enable key of the remote-control device being pressed by the user, reducing audio output volume provided by a media presentation system device device, cause audio output of other devices than the media presentation system device device to be muted, play a prompt that indicates that the media presentation system is ready to accept a spoken command; and
after the audio is reduced in response to the voice enable key of the remote-control device being pressed by the user, receiving audio data including data representing speech of the user including a media presentation system device command from the user.

8. The method of claim 7 wherein the media presentation system device includes a digital video recorder, and wherein controlling the media presentation system device includes controlling operation of the digital video recorder.

9. The method of claim 5, further comprising:
disambiguating a plurality of media presentation system device commands that correspond to the spoken command, by:
determining, based on the spoken command, the plurality of media presentation system device commands;
presenting the plurality of media presentation system device commands to the user;
receiving from the user an indication of one of the plurality of media presentation system device commands; and
controlling the media presentation system device using the one media presentation system device command.

10. The method of claim 9 wherein receiving the indication of the one media presentation system device command includes receiving an additional spoken command from the user.

11. The method of claim 5, further comprising:
determining audio data that represents a voice prompt directing the user to provide a spoken command; and
transmitting the determined audio data to an audio output device configured to play the voice prompt.

12. A method in a remote-control device that includes an audio input device and multiple keys, the method comprising:
under control of the remote-control device:
transmitting a signal by the remote-control device, the signal indicating a voice enable key of the remote-control device being pressed by the user, the signal including signaling information including a flag indicating a beginning of user speech and wherein the signal is generated in response to the voice enable key of the remote-control device being pressed by the user, the signal transmitted by the remote-control device in response to a voice enable key of the remote-control device being pressed by the user causing:
audio output volume provided by a media presentation system device to be reduced in response to the voice enable key of the remote-control device being pressed by the user;
audio output of other devices than the media presentation system device to be muted; and
immediately playing of a prompt that indicates that the media presentation system is ready to accept a spoken command;
after the audio output volume is reduced in response to the voice enable key of the remote-control device being pressed by the user, receiving audio data including data representing speech of the user including a media presentation system device command from the user; and
causing the media presentation system device to begin speech recognition upon the transmitted audio data.

13. The method of claim 12 further comprising controlling the media presentation system device based on a command spoken by the user that includes selecting programming identified by a title.

14. The method of claim 12 further comprising:
controlling the media presentation system device based on the audio data, including transmitting a command to control the media presentation system device, the transmitted command based on the audio data representing speech of the user including a media presentation system device command from the user.

15. The method of claim 12, further comprising:
transmitting an indication to the media presentation system device to reduce audio output volume.

16. The method of claim 15 wherein the transmitted indication is a signal generated by the remote-control device in response to another key pressed by the user than the voice enable key.

17. The method of claim 15 wherein the transmitted indication is a first portion of the received audio data.

18. The method of claim 12, further comprising:
receiving from the media presentation system device audio data that represents a voice prompt directing the user to provide a spoken command; and
playing the voice prompt.

* * * * *

UNITED STATES PATENT AND TRADEMARK OFFICE
CERTIFICATE OF CORRECTION

| | | |
|---|---|---|
| PATENT NO. | : 11,270,704 B2 | Page 1 of 1 |
| APPLICATION NO. | : 17/234399 | |
| DATED | : March 8, 2022 | |
| INVENTOR(S) | : Curtis N. Daly | |

It is certified that error appears in the above-identified patent and that said Letters Patent is hereby corrected as shown below:

In the Claims

Column 17, Claim 7, Line 66:
"media presentation system device device," should read: --media presentation system device,--.

Column 18, Claim 7, Line 1:
"presentation system device device to be muted," should read: --presentation system device to be muted,--.

Signed and Sealed this
Tenth Day of October, 2023

Katherine Kelly Vidal
*Director of the United States Patent and Trademark Office*